United States Patent
Veprinsky et al.

(10) Patent No.: US 9,524,220 B1
(45) Date of Patent: Dec. 20, 2016

(54) MEMORY OPTIMIZATION FOR CONFIGURATION ELASTICITY IN CLOUD ENVIRONMENTS

(75) Inventors: Alex Veprinsky, Brookline, MA (US); David Meiri, Cambridge, MA (US); John R. Sopka, Groton, MA (US); Patrick Brian Riordan, Newton, MA (US); John T. Fitzgerald, Mansfield, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 969 days.

(21) Appl. No.: 13/341,112

(22) Filed: Dec. 30, 2011

(51) Int. Cl.
  *G06F 12/00* (2006.01)
  *G06F 11/16* (2006.01)
  *G06F 3/06* (2006.01)

(52) U.S. Cl.
  CPC ......... *G06F 11/1666* (2013.01); *G06F 3/0601* (2013.01)

(58) Field of Classification Search
  CPC ... G06F 11/1666; G06F 11/20; G06F 11/2069; G06F 2003/0697; G06F 3/0601
  USPC .................................. 711/114, 118
  See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galzur et al. | |
| 5,845,147 A | 12/1998 | Vishlitzky et al. | |
| 5,857,208 A | 1/1999 | Ofek | |
| 7,054,883 B2 | 5/2006 | Meiri et al. | |
| 7,231,492 B2 * | 6/2007 | Baxter, III | 711/113 |
| 7,882,200 B2 * | 2/2011 | Sturrock | G06F 12/0813 709/217 |
| 7,925,829 B1 * | 4/2011 | Michael | G06F 3/0605 711/114 |
| 7,945,758 B1 * | 5/2011 | Michael | G06F 3/0607 711/114 |
| 7,970,992 B1 * | 6/2011 | Michael | G06F 3/0607 711/114 |
| 2005/0071424 A1 * | 3/2005 | Baxter, III | G06F 3/061 709/203 |

* cited by examiner

*Primary Examiner* — Mardochee Chery
(74) *Attorney, Agent, or Firm* — Muirhead and Saturnelli, LLC

(57) ABSTRACT

A system having a plurality of directors, at least some of which have a local director memory, accesses requested data by determining if requested data is in local director memory of a first one of the directors in response to an access request for the requested data by the first one of the directors. The system also determines if the requested data is native to the first one of the directors in response to the requested data not being in the local director memory of the first one of the directors, where data provided on a physical storage device coupled to the first one of the directors is native to the first one of the directors. The system also obtains the requested data from a second one of the directors in response to the requested data not being native to the first one of the directors.

20 Claims, 6 Drawing Sheets

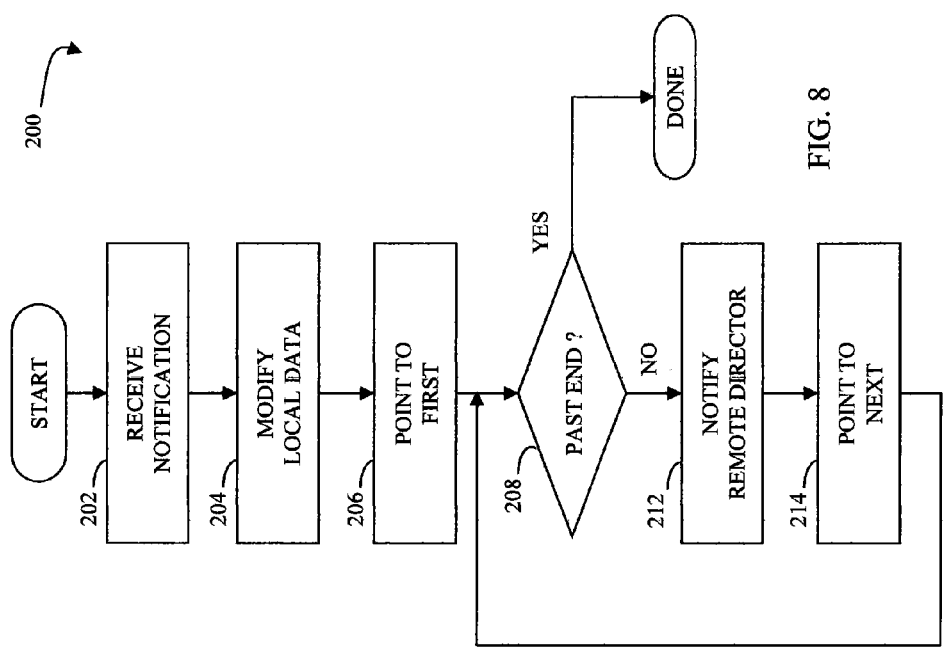

MEMORY OPTIMIZATION FOR CONFIGURATION ELASTICITY IN CLOUD ENVIRONMENTS

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

The storage device may include global memory that may be used for data caching. In some cases, the global memory may be distributed among local memory of the plurality of disk adapters, host adapters, and similar devices (generally known as "directors"). However, if a host that is coupled to a particular host adapter accesses cached data in global memory, it is most efficient if the portion of the global memory in which the data is cached corresponds to the local memory of the particular host adapter. However, in most situations, this will not be the case. In some instances, it is more likely that the data will be cached in local memory for a disk adapter coupled to a physical disk containing the data.

Accordingly, it is desirable to provide a system in which data is cached efficiently so that a device, such as a host, that is coupled to a director, accesses cached data from local memory of the director.

SUMMARY OF THE INVENTION

According to the system described herein, accessing data in a system having a plurality of directors, at least some of which have a local director memory, includes determining if requested data is in local director memory of a first one of the directors in response to an access request for the requested data by the first one of the directors, determining if the requested data is native to the first one of the directors in response to the requested data not being in the local director memory of the first one of the directors, where data provided on a physical storage device coupled to the first one of the directors is native to the first one of the directors, and obtaining the requested data from a second one of the directors in response to the requested data not being native to the first one of the directors. Accessing data in a system having a plurality of directors may also include storing the requested data in the local director memory of the first one of the directors following obtaining the requested data from the second one of the directors. Accessing data in a system having a plurality of directors may also include storing the requested data in the local director memory of the first one of the directors following obtaining the requested data from the second one of the directors in response to the requested data meeting a particular criteria. The particular criteria may include size of the requested data and a number of times the requested data is accessed. Accessing data in a system having a plurality of directors may also include informing the second one of the directors that the data has been modified in response to the access request being a write request and the requested data being obtained from the second one of the directors. Accessing data in a system having a plurality of directors may also include the second one of the directors maintaining a list of particular ones of the directors that have requested data. Accessing data in a system having a plurality of directors may also include the second director informing the particular ones of the directors that the data has been modified in response to receiving a message from the first one of the directors that the data has been modified. Accessing data in a system having a plurality of directors may also include removing data from local director memory in response to receiving a message from the second one of the directors that the data has been modified. Accessing data in a system having a plurality of directors may also include modifying data in local director memory in response to receiving a message from the second one of the directors that the data has been modified. Accessing data in a system having a plurality of directors may also include receiving a message indicating that the requested data has been modified by another one of the directors and informing other ones of the directors that the requested data has been modified, where informing other ones of the directors includes maintaining a list of directors that access the requested data.

According further to the system described herein, computer software, provided in a non-transitory computer-readable medium, accesses data in a system having a plurality of directors, at least some of which have a local director memory. The software includes executable code that determines if requested data is in local director memory of a first one of the directors in response to an access request for the requested data by the first one of the directors, executable code that determines if the requested data is native to the first one of the directors in response to the requested data not being in the local director memory of the first one of the directors, where data provided on a physical storage device coupled to the first one of the directors is native to the first one of the directors, and executable code that obtains the requested data from a second one of the directors in response to the requested data not being native to the first one of the directors. The software may also include executable code that stores the requested data in the local director memory of the first one of the directors following obtaining the requested data from the second one of the directors. The software may also include executable code that stores the requested data in the local director memory of the first one of the directors following obtaining the requested data from the second one of the directors in response to the requested data meeting a particular criteria. The particular criteria may include size of the requested data and a number of times the requested data is accessed. The software may also include executable code that informs the second one of the directors that the data has been modified in response to the access request being a write request and the requested data being obtained from the second one of the directors. The software may also include executable code that maintains a list of particular ones of the directors that have requested data. The software may also include executable code that informs the particular ones of the directors that the data has been modified in response to receiving a message from the first one of the directors that the data has been modified. The software may also include executable code that removes data from local director memory in response to receiving a message from the second one of the directors that the data has been modified. The software may also include executable code that modifies data in local director memory in response to receiving a message from the second one of the directors that the data has been modified. The software may also include executable code that receives a message indicating that the requested data has been modified by another one of the directors and executable code that informs other ones of the directors that the requested data has been modified, where informing other ones of the directors includes maintaining a list of directors that access the requested data.

BRIEF DESCRIPTION OF DRAWINGS

FIG. 8 is a flow chart illustrating steps performed in connection with notifying directors containing a local copy of data following a change in the data according to an embodiment of the system described herein.

DETAILED DESCRIPTION OF VARIOUS EMBODIMENTS

Figure 1:
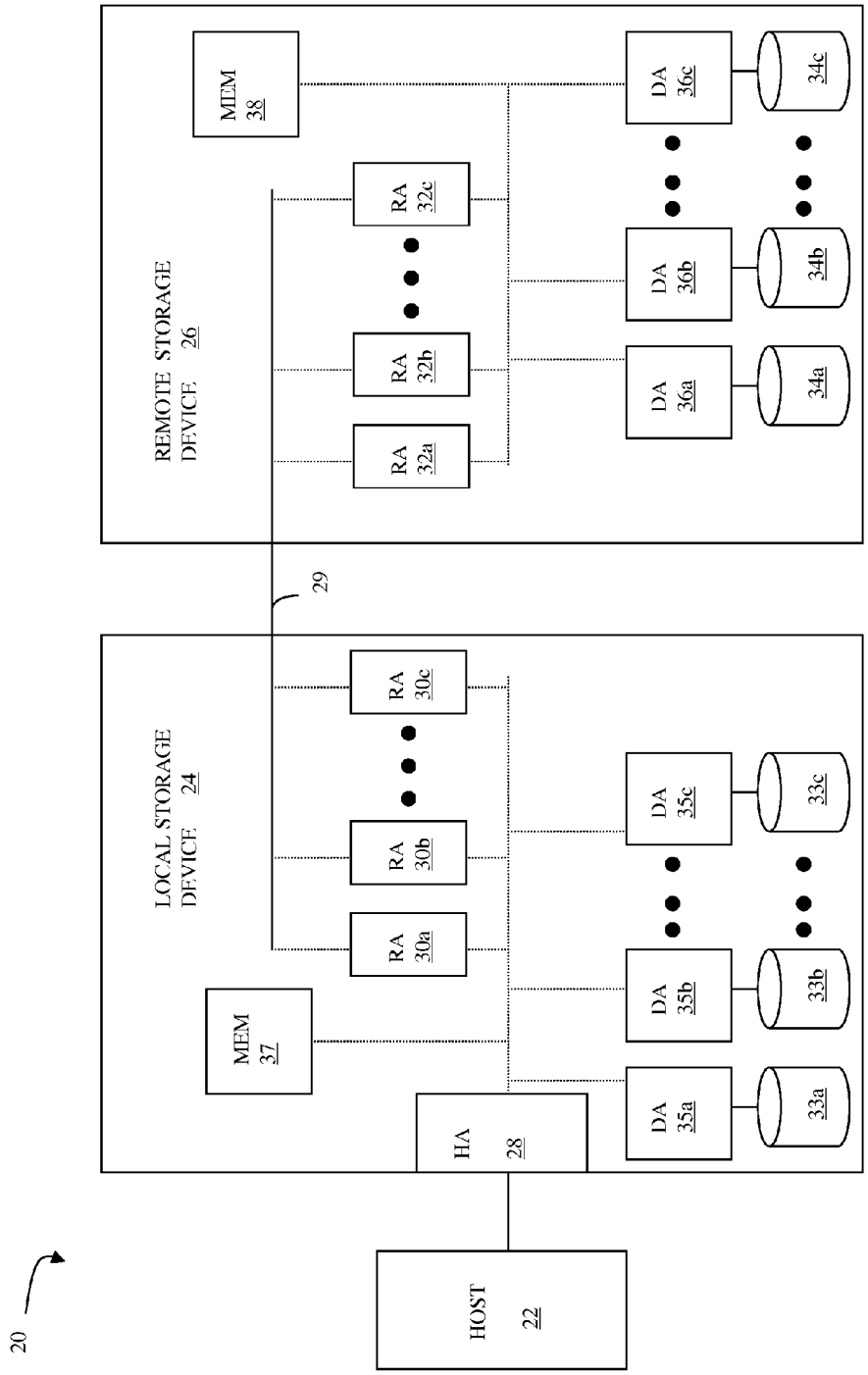
FIG. 1 is a schematic diagram showing a host, a local storage device, and a remote data storage device used in connection with an embodiment of the system described herein.

Referring to FIG. 1, a diagram 20 shows a relationship between a host 22, a local storage device 24, and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via a link 29 to cause the data on the remote storage device 26 to be identical to the data on the local storage device 24. In an embodiment herein, data may be copied using a synchronous RDF protocol (SRDR/S), an asynchronous RDF protocol (SRDF/A), and data mobility (DM) copy mode, a non-ordered background copy mode. Of course, other data copy modes may also be used. Communication using synchronous RDF is described, for example, in U.S. Pat. No. 5,742,792 titled "REMOTE DATA MIRRORING" to Yanai, et al., which is incorporated by reference herein. Communication using asynchronous RDF is described, for example, in U.S. Pat. No. 7,054,883 titled "VIRTUAL ORDERED WRITES FOR MULTIPLE STORAGE DEVICES" to Meiri, et al., which is incorporated by reference herein.

Although only one link is shown (the link 29), it is possible to have additional links between the storage devices 24, 26 and to have links between one or both of the storage devices 24, 26 and other storage devices (not shown). In addition, the link 29 may be provided using a direct connection (wired, over-the-air, or some combination thereof), a network (such as the Internet), or any other appropriate means for conveying data. Note that there may be a time delay between the transfer of data from the local storage device 24 to the remote storage device 26, so that the remote storage device 26 may, at certain points in time, contain data that is not identical to the data on the local storage device 24.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail elsewhere herein.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The remote data copying functionality described herein may be applied so that the data for at least a portion of the disks 33a-33c of the local storage device 24 is copied, using RDF or a different mechanism, to at least a portion of the disks 34a-34c of the remote storage device 26. It is possible that other data of the storage devices 24, 26 is not copied between the storage devices 24, 26, and thus is not identical.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 may be used to provide data to corresponding ones of the disks 34a-34c and receive data from corresponding ones of the disks 34a-34c. An internal data path exists between the DA's 35a-35e, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing a mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the mapping causes modified data to be transferred from the local storage device 24 to the remote storage device 26 using the RA's, 30a-30c, 32a-32e and the link 29. In steady state operation, the logical device on the remote storage device 26 contains data that is identical to the data of the logical device on the local storage device 24. When the RDF mechanism is used, the logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume. The system described herein may be implemented using software, hardware, and/or a combination of software and hardware where software may be stored in an appropriate storage medium and executed by one or more processors.

Figure 2:
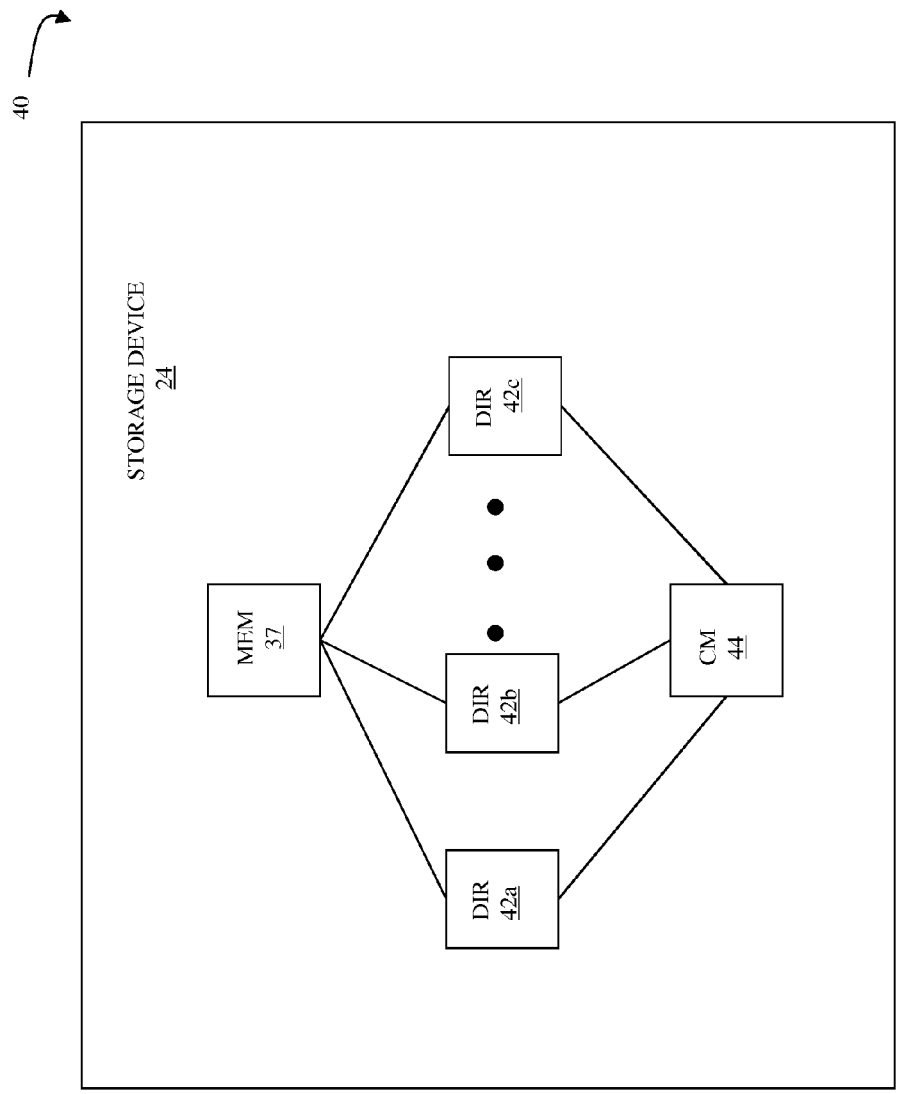
FIG. 2 is a schematic diagram showing a storage device, memory, a plurality of directors, and a communication module that may be used in connection with an embodiment of the system described herein.

Referring to FIG. 2, a diagram 40 illustrates an embodiment of the storage device 24 where each of a plurality of directors 42a-42c are coupled to the memory 37. Each of the directors 42a-42c represents the HA 28 (and/or other HA's), the RA's 30a-30c, or DA's 35a-35c. In an embodiment disclosed herein, there may be up to sixty four directors coupled to the memory 37. Of course, for other embodiments, there may be a higher or lower maximum number of directors that may be used.

The diagram 40 also shows an optional communication module (CM) 44 that provides an alternative communication path between the directors 42a-42c. Each of the directors 42a-42c may be coupled to the CM 44 so that any one of the directors 42a-42c may send a message and/or data to any other one of the directors 42a-42c without needing to go through the memory 37. The CM 44 may be implemented using conventional MUX/router technology where a sending one of the directors 42a-42c provides an appropriate address to cause a message and/or data to be received by an intended receiving one of the directors 42a-42c. Some or all of the functionality of the CM 44 may be implemented using one or more of the directors 42a-42c so that, for example, the directors 42a-42e may be interconnected directly with the interconnection functionality being provided on each of the directors 42a-42c. In addition, a sending one of the directors 42a-42c may be able to broadcast a message to all of the other directors 42a-42c at the same time.

In some embodiments, one or more of the directors 42a-42c may have multiple processor systems thereon and thus may be able to perform functions for multiple directors. In some embodiments, at least one of the directors 42a-42c having multiple processor systems thereon may simultaneously perform the functions of at least two different types of directors (e.g., an HA and a DA). Furthermore, in some embodiments, at least one of the directors 42a-42c having multiple processor systems thereon may simultaneously perform the functions of at least one type of director and perform other processing with the other processing system. In addition, all or at least part of the global memory 37 may be provided on one or more of the directors 42a-42c and shared with other ones of the directors 42a-42c. Some portion(s) of the memory of each of the directors 42a-42c may be globally accessible by any of the other directors 42a-42c while other portion(s) of the memory of each of the directors may be only locally accessible by one or more processors provided on the particular one of the directors 42a-42c that contains the memory.

Note that, although specific storage device configurations are disclosed in connection with FIG. 1 and FIG. 2, it should be understood that the system described herein may be implemented on any appropriate platform. Thus, the system described herein may be implemented using a platform like that described in connection with FIG. 1 and/or FIG. 2 or may be implemented using a platform that is somewhat or even completely different from any particular platform described herein.

Figure 3:
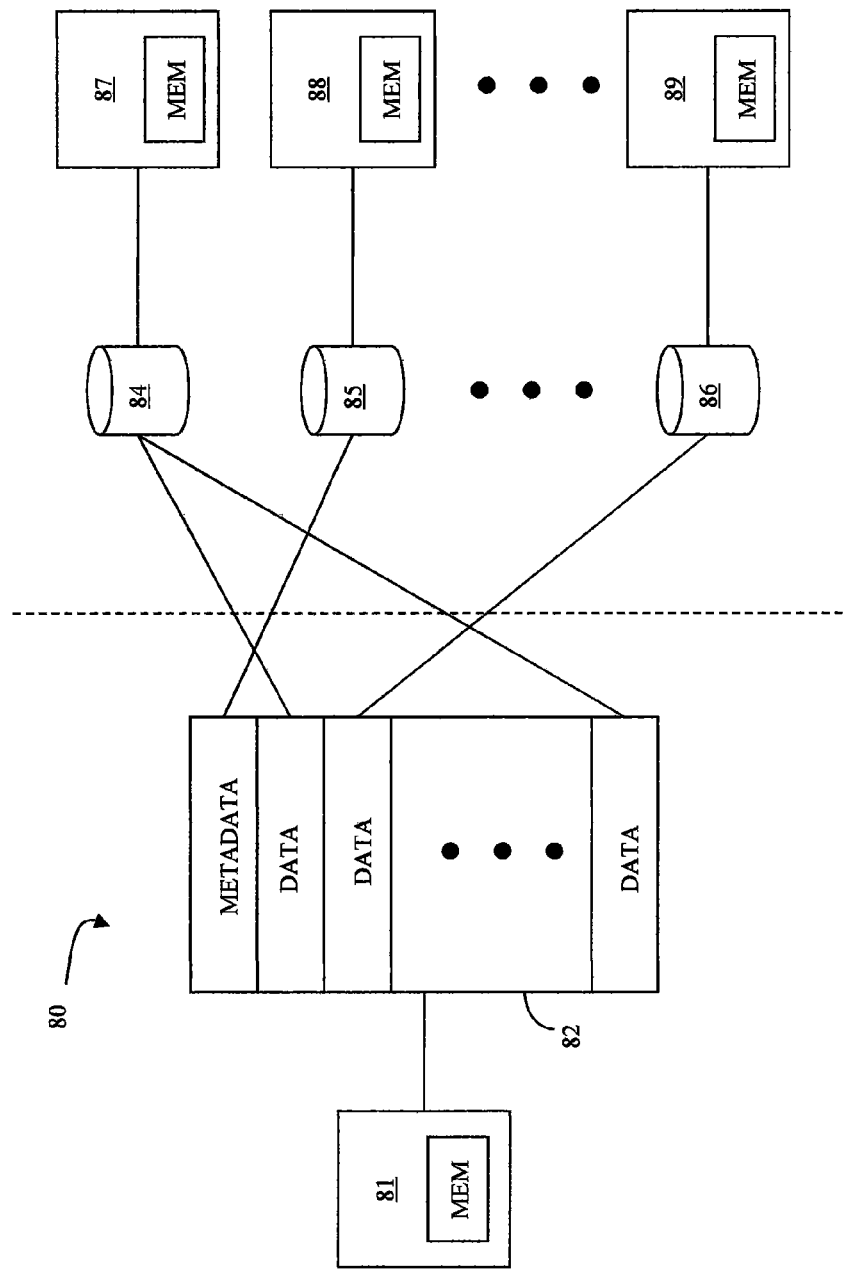
FIG. 3 is a schematic diagram showing a logical volume, a plurality of physical disks, and a plurality of directors according to an embodiment of the system described herein.

Referring to FIG. 3, a diagram 80 illustrates a director 81 that may be coupled to a host or similar device (not shown) that accesses a logical volume 82. The logical volume 82 includes a metadata section as well as a plurality of data sections. The metadata section includes metadata that may include information regarding location (mapping) of each of the data sections as well as information relating to creation date, modification date(s), author, etc. In an embodiment herein, each of the data sections may be a track of data where a track may correspond to eight sectors, a sector may correspond to sixteen blocks and a block may correspond to 512 bytes of data. Of course, in other embodiments, the sections could be any data increment and, in some embodiments, the sections are not necessarily the same size.

Each of the sections may be mapped to one of a plurality of physical storage devices 84-86 so that, for example, data for the logical device 82 may be provided on the physical storage device 84, 86 while metadata for other data of the logical device 82 may be provided on the physical storage device 85. Each of the physical storage devices 84-86 may be coupled to a corresponding one of a plurality of directors 87-89 that handle data transfers therebetween. The director 87 may handle data transfers for the physical storage device 84. The director 88 may handle data transfers for the physical storage device 85 and the director 89 may handle physical transfers for the physical storage device 86. Data on a physical storage device coupled to a particular director is deemed "native" data for that particular director. In some cases, a director may be coupled to more than one physical storage device.

As discussed elsewhere herein, each of the directors 81, 87-89 may include on-board memory (director memory) that may be accessed by other ones of the directors. The director memory may be volatile memory or other types of memory. However, even though data provided in the memory of a director may be accessed by other directors, it is significantly more efficient to have a director access local director memory (memory closely associated with the director)

rather than external director memory (memory more closely associated with a different director). In some embodiments, local director memory may be located on the same circuit board as the processor that is used to provide director functionality. As mentioned above, a host or other device may be coupled to the director 81 to access data of the logical storage device 82. For the system described herein, it is desirable to have as much of the data as possible be provided in the local director memory of the director 81 irrespective of which of the physical storage device 84-86 contains the data. As discussed elsewhere herein, the physical storage devices 84-86 may be disks, flash drives, and/or any other appropriate data storage device.

Figure 4:
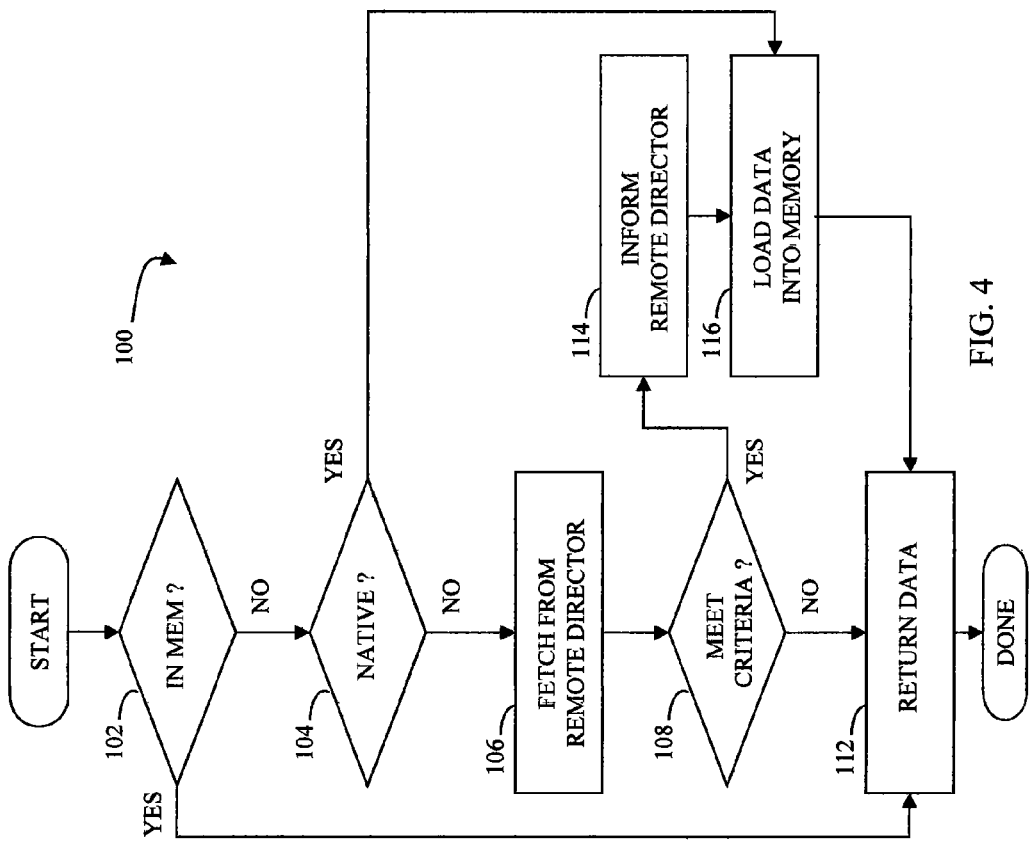
FIG. 4 is a flow chart illustrating steps performed in connection with reading data according to an embodiment of the system described herein.

Referring to FIG. 4, a flow chart 100 illustrates steps performed in connection with reading data at a local director coupled to a host or other device accessing a logical volume. For the discussion herein, the term "local director" may refer to a director that is performing the processing illustrated by the flow chart 100 (or other flow charts) while the term "remote director" refers directors other than the local director.

Processing begins at a first step 102 where it is determined if the data being accessed is already in the local memory of the local director (local director memory). If not, then control transfers to a test step 104 where it is determined if the data being accessed is native to the local director (i.e., is stored in a physical storage device such as a disk or a flash drive that is coupled to the local director). If not, then control transfers from the test step 104 to a step 106 where the data is fetched from another director (i.e., the remote director coupled to the physical storage containing the data or possibly some other remote director).

Following the step 106 is a test step 108 where it is determined if the data that was fetched at the step 106 meets a criteria for being maintained locally. In an embodiment herein, only some of the data fetched at the step 106 will be maintained at the director after performing the read operation. The test at the step 108 determines if the data meets whatever criteria is being used. Note that, in some embodiments, it is possible to maintain all data that has been fetched at the step 106 and, when there is no more room in the local director memory, data is removed from the director memory based on other criteria. In other embodiments, the system maintains all metadata that has been fetched at the step 106 but only selectively maintains fetched data.

In an embodiment herein, the test at the step 108 determines if the data has been recently fetched (e.g., at the step 106). In this embodiment, since the test step 108 follows the step 106, the result of the test at the step is always true (yes). In other embodiments, it is possible to use other tests, such as determining if there have been a certain number of accesses of the same data in a particular period of time (e.g., three accesses in one minute). In another embodiment, the size of the data may be used as a criteria at the step 108. In some embodiments, a score may be used where the score varies according to the size of the data and/or the frequency of access and/or some other criteria. In embodiments that use a score, the system may store data locally if the score is higher than other data that is being stored locally and/or data having a score higher than a predetermined threshold. Of course, other tests and techniques may be used and there may be a first criteria for metadata and a second, different, criteria for data.

If it is determined at the test step 108 that the criteria is not met, then control transfers from the step 108 to a step 112 where the requested data is returned to the calling entity (e.g., a host coupled to the local director). Note that the step 112 may also be reached directly from the step 102 if it is determined at the step 102 that the requested data is already in the director memory of the local director. Following the step 112, processing is complete.

If it is determined at the test step 108 that the criteria for maintaining remote data in the director memory is met, then control transfers from the test step 108 to a step 114 where information is provided to indicate to the remote director that provided the data at the step 106 that data therefrom is being stored in the director memory of the local director. As discussed elsewhere herein, this information is useful when the data is modified so that all of the directors that are maintaining a reliable copy of the data. This is described in more detail elsewhere herein. Following the step 114 is a step 116 where the data is loaded into the director memory. Note that the step 116 may also reached from the test step 104 if it determined at the test step 104 that the requested data is native to the local director (i.e., is stored on a physical storage device coupled to the local director), in which case loading the data at the step 116 may include reading the data from a non-volatile memory, such as a disk drive or a flash drive. Having the data in the local director memory allows for rapid access on subsequent read requests and/or write requests. Following the step 116 is the step 112, discussed above, where the data is returned to the calling entity.

Figure 5:
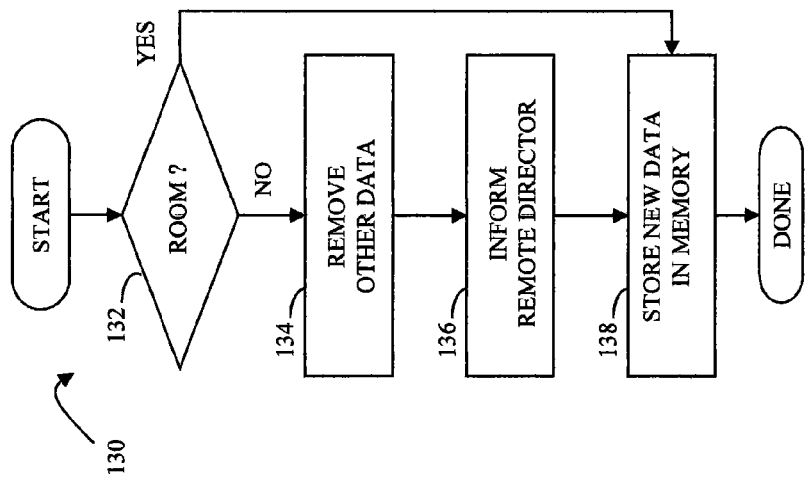
FIG. 5 is a flow chart illustrating steps performed in connection with storing data in a memory of a director according to an embodiment of the system described herein.

Referring to FIG. 5, a flow chart 130 illustrates in more detail processing performed in connection with loading data into local director memory at the step 116, discussed above. Processing begins at a first step 132 where it is determined if there is enough room in the local director memory to load (store) the data therein. In an embodiment herein, a certain amount of the local director memory may be allocated for storing data from one or more remote directors and/or data that is native to the local director. The test at the step 132 determines if there is enough free space in the allocated memory portion to store the data from the remote director.

If it is determined at the test step 132 that there is not enough room, then control transfers from the test step 132 to a step 134 where other data is removed from the director memory. Any appropriate criteria may be used to determine which data to remove from the memory. In an embodiment herein, the criteria used at the step 134 may be similar to or relate to the criteria used at the test step 108, discussed above.

Following the step 134 is a step 136 where the source of the data that was removed at the step 134 is informed that the data is no longer in the director memory of the local director. As discussed elsewhere herein, this information is useful when the data changes so that the directors that are maintaining a copy of the data in their director memory may be notified. Once data has been removed from the local director memory, it is no longer necessary to notify the local director when the data changes. Following the step 136 is a step 138 where the new data is stored in the director memory of the local director. Note that the step 138 is also reached from the test step 132 if it is determined at the step 132 that there initially is enough free space to store the data in question. Following the step 138, processing is complete.

Figure 6:
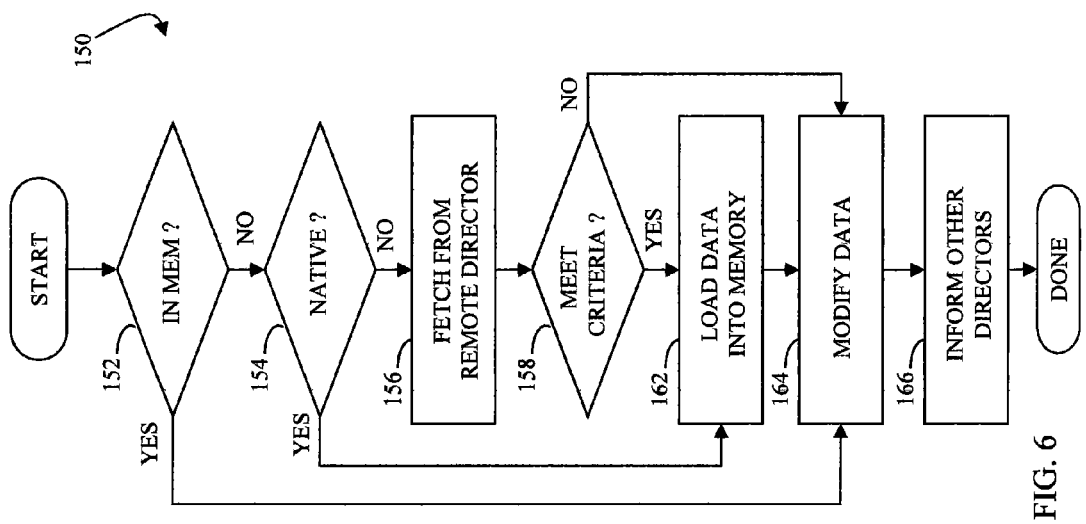
FIG. 6 is a flow chart illustrating steps performed in connection with writing data according to an embodiment of the system described herein.

Referring to FIG. 6, a flow chart 150 illustrates processing performed in connection with modifying (writing) data. Processing begins at a first step 152 where it is determined if the data being modified is already in the local director memory. If not, then control transfers from the step 152 to a test step 154 where it is determined if the data being modified is native to the local director (discussed in detail elsewhere herein). If not, then control transfers from the test step 154 to a step 156 where the data is requested from the appropriate remote director having the data.

Following the step 156 is a test step 158 where it is determined if the data meets a criteria for being maintained in the local director memory. The test at the step 158 may be similar to the test at the step 108, discussed above, which determines if the data meets whatever criteria is being used. Note that, in some embodiments, it is possible to maintain all data that has been fetched at the step 106 and, when there is no more room in memory, remove data from the memory based on other criteria. In other embodiments, the system maintains all metadata that has been fetched but only selectively maintains fetched data. The test at the step 158 may be the same or different than the test at the step 108.

If it is determined at the test step 158 that the data meets the criteria (whatever that is) for maintaining a copy of the data in the local director memory, then control transfers from the test step 158 to a step 168 where the data is loaded into the local director memory, as described in more detail elsewhere herein. Note that the step 162 is also reached from the test step 154 if it is determined at the test step 154 that the data is native to the local director, in which case loading the data at the step 162 may include reading the data from a disk, flash drive, or similar device that is coupled to the local director.

Following the step 162 is a step 164 where the data is modified (written). Note that the step 164 is also reached from the test step 152 if it is determined at the test step 152 that the data is already in the local director memory. Note also that the step 164 is also reached from the test step 158 if it is determined at the step 158 that the data does not meet the criteria for being maintained in the local director memory. Following the step 164 is a step 166 where other (remote) directors are informed, as appropriate, that the data has been changed. In an embodiment herein, if the data is native to the local director, then processing performed at the step 166 includes reporting the data modification to all of the remote directors that contain a copy of the data in director memory. This is described in more detail elsewhere herein. Alternatively, if the data is not native to the local director, then the processing performed at the step 166 includes sending an appropriate message to the remote director that is the source of the data (the remote director to which the data is native), as described in more detail elsewhere herein. Following the step 166, processing is complete.

Figure 7:
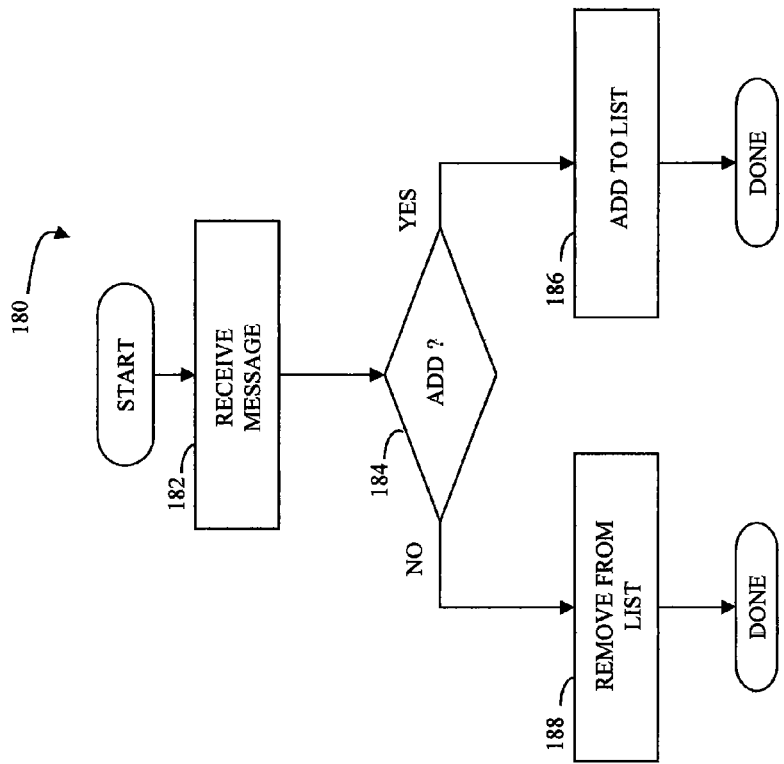
FIG. 7 is a flow chart illustrating steps performed in connection with maintaining a list of directors containing a local copy of data according to an embodiment of the system described herein.

Referring to FIG. 7, a flow chart 180 illustrates steps performed in connection with a director receiving a message from a remote director indicating a change of state with respect to data maintained in an external director memory. That is, the change of state indicates that the data is being added to the director memory of the remote director (e.g., the step 114, described above) or the data is being removed from the director memory of the remote director (e.g., the step 136, described above). Processing begins at a first step 182 where the local director receives the message. Following the step 182 is a test step 184 where it is determined if the message indicates that the remote director is adding the data to the director memory thereof. If so, then control transfers from the test step 184 to a step 186 where the remote director is added to a list maintained by the local director. In an embodiment herein, the local director maintains a list of all remote directors that are storing, in director memory thereof, a copy of data that is native to the local director. Following the step 186, processing is complete.

If it is determined at the test step 184 that the message does not indicate that the remote director is adding the data to the director memory thereof, and thus is removing the data, then control transfers from the test step 184 to a step 188 where the remote director is removed from the list of the local director. Following the step 188, processing is complete.

Referring to FIG. 8, a flow chart 200 illustrates steps performed in connection with a local director receiving notification that native data thereof has been changed by a remote director. Processing begins at a first step 202 where the local director receives a notification regarding the change. In an embodiment herein, the notification received at the step 202 may include an indication of the data that has changed, including the relative location of the data within the director memory of the local director (or equivalent) and the specific change made to the data (new value of data). Note that the change to the data may be made by any of the remote directors that have write access to the data.

Following the step 202 is a step 204 where the native version of the data (provided on the local director) is modified. Following the step 204 is a step 206 where an iteration pointer, used to iterate through all of the remote directors that contain a copy of the data in the director memory thereof, is set to point to the first remote director in the list. Creating and maintaining the list of remote directors is discussed in more detail elsewhere herein (see, for example, FIG. 7 and the corresponding description).

Following the step 206 is a test step 208 where it is determined if the iteration pointer points past the end of the list (all remote directors have been processed). If so, then processing is complete. Otherwise, control transfers from the test step 208 to a step 212 where the remote director indicated by the pointer is notified of the data change. The notification at the step 212 can take any appropriate form, including providing information to the remote director to allow the remote director to make corresponding changes to the data stored in the director memory thereof. The remote director may take any appropriate action, including modifying the data or removing the data from the local director memory thereof. Following the step 212 is a step 214 where the iteration pointer is incremented. Following the step 214, control transfers back to the test step 208, discussed above, for another iteration.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage devices having components as described herein may, alone or in combination with other devices, provide an appropriate platform that executes any of the steps described herein. In some embodiments, at least some of the directors may not have any native data associated therewith. It is also possible for some of the directors to not have any local director memory.

In some instances, the order of steps in the flowcharts, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is provided in a non-volatile computer readable storage medium and executed by one or more processors. The non-volatile computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of accessing data in a system with a plurality of directors, at least some of the directors including a local director memory, the method comprising:
    determining if requested data is in local director memory of a first one of the directors in response to an access request for the requested data by the first one of the directors;
    determining if the requested data is native to the first one of the directors in response to the requested data not being in the local director memory of the first one of the directors, wherein data provided on a physical storage device coupled to the first one of the directors is native to the first one of the directors;
    obtaining the requested data from the physical storage device coupled to the first one of the directors and storing the requested data obtained from the physical storage device in the local director memory of the first one of the directors in response to the requested data not being in the local director memory of the first one of the directors and the requested data being native to the first one of the directors;
    obtaining the requested data from a second one of the directors in response to the requested data not being native to the first one of the directors;
    determining if the obtained requested data should be maintained in the local director memory of the first one of the directors in accordance with a criterion related to a characteristic of the data; and
    in response to determining that the obtained requested data should be maintained in the local director memory of the first one of the directors, notifying other ones of the directors, wherein each of the other ones of the directors updates a list of directors that are storing, in director memory thereof, a copy of data.

2. The method, according to claim 1, further comprising:
    storing the requested data in the local director memory of the first one of the directors following obtaining the requested data from the second one of the directors.

3. The method, according to claim 1, further comprising:
    storing the requested data in the local director memory of the first one of the directors following obtaining the requested data from the second one of the directors in response to the requested data meeting a particular criteria.

4. The method, according to claim 3, wherein the particular criteria includes size of the requested data and a number of times the requested data is accessed.

5. The method, according to claim 1, further comprising:
    informing the second one of the directors that the data has been modified in response to the access request being a write request and the requested data being obtained from the second one of the directors.

6. The method, according to claim 5, further comprising:
    the second one of the directors maintaining a list of particular ones of the directors that have requested data.

7. The method, according to claim 6, further comprising:
    the second director informing the particular ones of the directors that the data has been modified in response to receiving a message from the first one of the directors that the data has been modified.

8. The method, according to claim 7, further comprising:
    removing data from local director memory in response to receiving a message from the second one of the directors that the data has been modified.

9. The method, according to claim 7, further comprising:
    modifying data in local director memory in response to receiving a message from the second one of the directors that the data has been modified.

10. The method, according to claim 1, further comprising:
    receiving a message indicating that the requested data has been modified by another one of the directors; and
    informing other ones of the directors that the requested data has been modified, wherein informing other ones of the directors includes maintaining a list of directors that access the requested data.

11. Computer software, provided in a non-transitory computer-readable medium, that accesses data in a system with a plurality of directors, at least some of the directors including a local director memory, the software comprising:
    executable code that determines if requested data is in local director memory of a first one of the directors in response to an access request for the requested data by the first one of the directors;
    executable code that determines if the requested data is native to the first one of the directors in response to the requested data not being in the local director memory of the first one of the directors, wherein data provided on a physical storage device coupled to the first one of the directors is native to the first one of the directors;
    executable code that obtains the requested data from the physical storage device coupled to the first one of the directors and stores the requested data obtained from the physical storage device in the local director memory of the first one of the directors in response to the requested data not being in the local director memory of the first one of the directors and the requested data being native to the first one of the directors;
    executable code that obtains the requested data from a second one of the directors in response to the requested data not being native to the first one of the directors;
    executable code that determines if the obtained requested data should be maintained in the local director memory of the first one of the directors in accordance with a criterion related to a characteristic of the data; and
    executable code that, in response to determining that the obtained requested data should be maintained in the local director memory of the first one of the directors, notifies other ones of the directors, wherein each of the other ones of the directors updates a list of directors that are storing, in director memory thereof, a copy of data.

12. Computer software, according to claim 11, further comprising:
    executable code that stores the requested data in the local director memory of the first one of the directors following obtaining the requested data from the second one of the directors.

13. Computer software, according to claim 11, further comprising:

executable code that stores the requested data in the local director memory of the first one of the directors following obtaining the requested data from the second one of the directors in response to the requested data meeting a particular criteria.

14. Computer software, according to claim 13, wherein the particular criteria includes size of the requested data and a number of times the requested data is accessed.

15. Computer software, according to claim 11, further comprising:

executable code that informs the second one of the directors that the data has been modified in response to the access request being a write request and the requested data being obtained from the second one of the directors.

16. Computer software, according to claim 15, further comprising:

executable code that maintains a list of particular ones of the directors that have requested data.

17. Computer software, according to claim 16, further comprising:

executable code that informs the particular ones of the directors that the data has been modified in response to receiving a message from the first one of the directors that the data has been modified.

18. Computer software, according to claim 17, further comprising:

executable code that removes data from local director memory in response to receiving a message from the second one of the directors that the data has been modified.

19. Computer software, according to claim 17, further comprising:

executable code that modifies data in local director memory in response to receiving a message from the second one of the directors that the data has been modified.

20. Computer software, according to claim 11, further comprising:

executable code that receives a message indicating that the requested data has been modified by another one of the directors; and executable code that informs other ones of the directors that the requested data has been modified, wherein informing other ones of the directors includes maintaining a list of directors that access the requested data.

* * * * *